United States Patent
Watanabe et al.

(10) Patent No.: US 11,771,107 B2
(45) Date of Patent: Oct. 3, 2023

(54) TRANSESTERIFIED FAT OR OIL

(71) Applicant: FUJI OIL HOLDINGS INC., Osaka (JP)

(72) Inventors: Shimpei Watanabe, Osaka (JP); Yasuko Sato, Osaka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 403 days.

(21) Appl. No.: 16/979,864

(22) PCT Filed: Mar. 18, 2019

(86) PCT No.: PCT/JP2019/011153
§ 371 (c)(1),
(2) Date: Sep. 11, 2020

(87) PCT Pub. No.: WO2019/188492
PCT Pub. Date: Oct. 3, 2019

(65) Prior Publication Data
US 2021/0045404 A1    Feb. 18, 2021

(30) Foreign Application Priority Data
Mar. 26, 2018   (JP) ................................. 2018-058002

(51) Int. Cl.
*A23G 1/38*    (2006.01)
*A23D 9/00*    (2006.01)

(52) U.S. Cl.
CPC ........ *A23G 1/38* (2013.01); *A23D 9/00* (2013.01)

(58) Field of Classification Search
CPC ................................... A23G 1/38; A23D 9/00
See application file for complete search history.

(56) References Cited

U.S. PATENT DOCUMENTS

| | | | |
|---|---|---|---|
| 4,208,445 A | 6/1980 | Cottier et al. | |
| 2015/0093492 A1 | 4/2015 | Uehara et al. | |

FOREIGN PATENT DOCUMENTS

| | | | |
|---|---|---|---|
| CN | 110505807 | | 11/2019 |
| EP | 3603409 | | 2/2020 |
| JP | 2005507028 | | 3/2005 |
| JP | 2007319043 | | 12/2007 |
| JP | 2008182961 | | 8/2008 |
| JP | 2010142152 | | 7/2010 |
| JP | 2010142153 | | 7/2010 |
| JP | 2010532802 | | 10/2010 |
| JP | 2011115075 | | 6/2011 |
| JP | 5350768 B2 | * | 11/2013 |
| JP | 2016116486 | | 6/2016 |
| JP | 2016116486 A | * | 6/2016 |
| WO | 2007129590 | | 11/2007 |
| WO | 2009116396 | | 9/2009 |
| WO | 2011138918 | | 11/2011 |
| WO | 2012161105 | | 11/2012 |
| WO | 2018181159 | | 10/2018 |

OTHER PUBLICATIONS

"Office Action of Indonesia Counterpart Application", dated Feb. 7, 2022, with English translation thereof, p. 1-p. 6.
"Written Opinion of the International Searching Authority (Form PCT/ISA/237) of PCT/JP2019/011153," dated Jun. 11, 2019, with English translation thereof, pp. 1-12.
"Written Opinion of Singapore Counterpart Application", dated Apr. 29, 2021, pp. 1-6.
"Office Action of Taiwan Counterpart Application" with English translation thereof, dated Oct. 7, 2022, p. 1-p. 9.
Japan Oil Chemists' Society, "The handbook of oil chemistry-lipids and surfactants", Maruzen Co., Ltd., Fourth Edition, Nov. 20, 2001, with English translation thereof, pp. 1-3.
"International Search Report (Form PCT/ISA/210) of PCT/JP2019/011153," dated Jun. 11, 2019, with English translation thereof, pp. 1-4.
"Search Report of Europe Counterpart Application", dated Nov. 24, 2021, p. 1-p. 9.
"Office Action of China Counterpart Application", dated Apr. 1, 2023, with English translation thereof, p. 1-p. 15.

* cited by examiner

*Primary Examiner* — Erik Kashnikow
*Assistant Examiner* — Assaf Zilbering
(74) *Attorney, Agent, or Firm* — JCIPRNET

(57) ABSTRACT

A chocolate that has a reduced trans fatty acid content and still has a high compatibility with cocoa butter, high blooming resistance and good meltability in the mouth. A transesterified fat or oil has a content of unsaturated fatty acids controlled such that it is 10 mass % or less in the constituent fatty acid composition thereof, and the composition of other fatty acids is adjusted to a preset content.

9 Claims, No Drawings

TRANSESTERIFIED FAT OR OIL

CROSS-REFERENCE TO RELATED APPLICATION

This application is a 371 application of the international PCT application serial no. PCT/JP2019/011153, filed on Mar. 18, 2019, which claims the priority benefit of Japan application no. 2018-058002, filed on Mar. 26, 2018. The entirety of each of the above-mentioned patent applications is hereby incorporated by reference herein and made a part of this specification.

TECHNICAL FIELD

The present invention relates to a transesterified fat or oil, and an oil-based food product formed using the transesterified fat or oil, particularly chocolate which is not subjected to a tempering operation.

BACKGROUND ART

Hard butters, which are widely used as a substitute for cocoa butter, are roughly classified into tempered type hard butters for which a temperature control operation is performed during solidification and molding, and non-tempered type hard butters for which a temperature control operation is not performed. Tempered type hard butter contains a large amount of SUS type triglycerides (S: saturated fatty acids having 16 to 18 carbon atoms, U: monounsaturated fatty acids having 18 carbon atoms) contained in cocoa butter, and has similar physical properties to those of cocoa butter. For this reason, although it has high compatibility with cocoa butter, and a texture similar to that of cocoa butter can be obtained, strict temperature control is required for a tempering operation, and it is desired to omit this operation.

On the other hand, non-tempered type hard butters are not required to be subjected to a complicated tempering operation, and thus can be suitably used for various combination food products obtained by combining chocolate with bread or Western confectionery. They can be roughly divided into trans fatty acid type hard butters, transesterification/fractionation type hard butters, and lauric acid type hard butters.

Among non-tempered type hard butters, trans acid type hard butters obtained by hydrogenating liquid oils such as soybean oil and rapeseed oil have been widely used because of their favorable melting sensation in the mouth and high compatibility with cocoa butter. However, in recent years, the risk of trans fatty acids to health has become clear, and low trans fatty acid type hard butters not containing trans fatty acids have come to be desired.

While low trans acid type hard butters have come to be desired as described above, transesterification/fractionation type hard butters have been developed in recent years (Patent Literature 1 to Patent Literature 4). This transesterification/fractionation type hard butter is a hard butter having a favorable melting sensation in the mouth due to being chemically or enzymatically transesterified from raw materials which are raw material fats or oils having an extremely low content of trans fatty acids, for example, an extremely hardened oil from soybean oil or rapeseed oil, or a solid fat such as palm oil, and thereafter, being fractionated. However, the cost is high due to the complexity of a manufacturing method, and cheaper hard butters are desired.

Laurie acid type hard butter has been manufactured for a long time using, as raw materials, fats or oils in which a content of triglycerides containing a large amount of lauric acid is high, and examples thereof include palm kernel oil fractionated hardened oil and coconut oil. This type has various advantages such as a texture and physical properties very similar to those of cocoa butter and favorable gloss, but because significant blooming and graining may occur during storage, a large amount of cacao and cocoa butter cannot be incorporated thereinto.

Patent Literature 5 to Patent Literature 9 disclose a fat or oil composition for chocolates which contains a low content of trans acids and contains a laurin-based fat or oil.

CITATION LIST

Patent Literature

[Patent Literature 1]
Published Japanese Translation No. 2005-507028 of the PCT International Publication
[Patent Literature 2]
Published Japanese Translation No. 2010-532802 of the PCT International Publication
[Patent Literature 3]
Japanese Patent Laid-Open No. 2007-319043
[Patent Literature 4]
PCT International Publication No. WO2011/138918
[Patent Literature 5]
Japanese Patent Laid-Open No. 2008-182961
[Patent Literature 6]
Japanese Patent Laid-Open No. 2010-142152
[Patent Literature 7]
Japanese Patent Laid-Open No. 2010-142153
[Patent Literature 8]
Japanese Patent Laid-Open No. 2011-115075
[Patent Literature 9]
Japanese Patent Laid-Open No. 2016-116486

SUMMARY OF INVENTION

Technical Problem

In recent years, consumer requirements with regard to chocolate have become more focused on favorable taste. Non-tempered type hard butter is desired from the viewpoint of its good workability. Similarly for chocolate for coating applications, not only physical properties such as workability and solidification speed, but also qualities leading to flavor such as cacao texture and chocolate texture are required. A cacao texture has a chocolate flavor that can be felt more strongly by increasing a formulation amount of cacao mass in chocolate, and cacao mass is indispensable for imparting a cacao texture and a delicious chocolate flavor. However, about 55 mass % of cacao mass is cocoa butter, and when a large amount of cacao mass is blended in, this means that a large amount of cocoa butter is blended in at the same time. This results in generation of fat blooming in a coating process in which tempering is not performed, and therefore there is limitation on a formulation amount of cacao mass.

The inventors of the present invention have considered improving a quality and functionality of a transesterified fat or oil having a low content of trans acids. In Patent Literature 1 to Patent Literature 4, which are fat or oil compositions for chocolate having a low content of trans acids and not containing laurin-based fats or oils, a melting sensation in the mouth tended to be poor. Although Patent Literature 5 to Patent Literature 9 have a relatively good melting sensation in the mouth, it was thought that it was necessary to further improve the quality regarding a formulation limit of cocoa butter, bloom resistance, and poor melting sensation in the mouth.

In recognition of such related art, the present invention provides a transesterified fat or oil which has sharp melting-point characteristics while a content of trans fatty acids is still able to be reduced.

Solution to Problem

As a result of intensive studies, the inventors of the present invention have found that the aforementioned transesterified fat or oil can be obtained by controlling a content of unsaturated fatty acids such that it is 10 mass % or less in a composition of constituent fatty acids and adjusting a composition of other fatty acids to have a preset content, and therefore have completed the present invention.

That is, the present invention is as follows.

(1) A transesterified fat or oil which satisfies all of the following (A) to (F), in which a total content of (B) and (E) is 10 mass % to 20 mass %, a content of CN30 to CN38 is 18 to 50 mass %, and a content of CN48 or higher is 35 mass % or less, a content (A) of saturated fatty acids having 6 to 18 carbon atoms in a composition of constituent fatty acids is 90 to 99.5 mass %, a content (B) of saturated fatty acids having 6 to 10 carbon atoms in the composition of constituent fatty acids is 6 to 18 mass %, a content (C) of lauric acid in the composition of constituent fatty acids is 20 to 50 mass %, a content (D) of saturated fatty acids having 16 to 18 carbon atoms in the composition of constituent fatty acids is 30 to 50 mass %, a content (E) of unsaturated fatty acids in the composition of constituent fatty acids is 0.5 to 10 mass %, and a content (F) of trans fatty acids in the composition of constituent fatty acids is 5 mass % or less, where, the fatty acids are propyl-esterified and analyzed in analysis of the composition of fatty acids, CN30 to CN38: triglycerides in which a total number of carbon atoms of the constituent fatty acids of the triglycerides in the fat or oil is 30 to 38, and CN48 or higher: triglycerides in which a total number of carbon atoms of the constituent fatty acids of the triglycerides in the fat or oil is 48 or more.

(2) The transesterified fat or oil according to (1), which satisfies the following (G) and (H), a content (G) of saturated fatty acids having 12 or less carbon atoms in the composition of constituent fatty acids is 35 to 60 mass %, and a content (H) of saturated fatty acids having 20 or more carbon atoms in the composition of constituent fatty acids is 1 mass % or less, where, the fatty acids are propyl-esterified and analyzed in analysis of the composition of fatty acids.

(3) The transesterified fat or oil according to (1) or (2), in which (content of CN 48 or higher)/(content of CN 28 or lower) is 30 or less, where, CN48 or higher: triglycerides in which a total number of carbon atoms of the constituent fatty acids of the triglycerides in the fat or oil is 48 or more, and CN28 or lower: triglycerides in which a total number of carbon atoms of the constituent fatty acids of the triglycerides in the fat or oil is 28 or less.

(4) The transesterified fat or oil according to any one of (1) to (3), in which a content of CN48 or higher is 30 mass % or less, CN48 or higher: triglycerides in which a total number of carbon atoms of the constituent fatty acids of the triglycerides in the fat or oil is 48 or more.

(5) The transesterified fat or oil according to any one of (1) to (4), which satisfies all of the following with regard to a SFC (solid fat content) %, a SFC at 10° C. is 85% to 100%, a SFC at 20° C. is 65% to 80%, a SFC at 25° C. is 49% to 75%, a SFC at 30° C. is 25% to 55%, a SFC at 35° C. is 5% to 30%, and a SFC at 40° C. is 10% or less.

(6) The transesterified fat or oil according to (3), which satisfies all of the following with regard to a SFC %, a SFC at 10° C. is 85% to 100%, a SFC at 20° C. is 65% to 80%, a SFC at 25° C. is 49% to 70%, a SFC at 30° C. is 25% to 50%, a SFC at 35° C. is 5% to 30%, and a SFC at 40° C. is 10% or less.

(7) The transesterified fat or oil according to (4), which satisfies all of the following with regard to a SFC %, a SFC at 10° C. is 85% to 100%, a SFC at 20° C. is 65% to 80%, a SFC at 25° C. is 49% to 70%, a SFC at 30° C. is 25% to 50%, a SFC at 35° C. is 5% to 30%, and a SFC at 40° C. is 5% or less.

(8) A fat or oil for chocolate, containing the transesterified fat or oil according to any one of (1) to (7).

(9) Chocolate containing the transesterified fat or oil according to any one of (1) to (7).

Advantageous Effects of Invention

According to the present invention, a transesterified fat or oil having sharp melting-point characteristics can be obtained.

In a preferable aspect of the transesterified fat or oil of the present invention, a solidification speed is fast and workability when being used in chocolate is excellent while a content of saturated fatty acids having 16 or more carbon atoms which are fatty acids worsening a melting sensation in the mouth is still able to be reduced.

As a preferable aspect, by using the transesterified fat or oil of the present invention for chocolate, it is possible to manufacture chocolate which is not required to be subjected to a tempering operation, has excellent compatibility with cocoa butter and excellent bloom resistance, and has favorable melting sensation in the mouth, while still being able to reduce a content of trans fatty acids.

In a more preferable aspect, by using the transesterified fat or oil of the present invention for chocolate for coating, it is possible to provide delicious chocolate for coating which is not required to be subjected to a tempering operation even when a large amount of cacao mass is incorporated thereinto, has a favorable melting sensation in the mouth, and has a texture of cacao beans.

DESCRIPTION OF EMBODIMENTS

Hereinafter, the present invention will be described in more detail.

Examples of fats or oils usable in a transesterified fat or oil of the present invention include vegetable fats or oils such as rapeseed oil, soybean oil, sunflower seed oil, cottonseed oil, peanut oil, rice bran oil, corn oil, safflower oil, olive oil, kapok oil, sesame oil, evening primrose oil, palm oil, palm kernel oil, coconut oil, medium-chain-triacylglycerols-bonded fats or oils (MCT), shea fat, and sal fat; animal fats or oils such as milk fat, beef fat, lard, fish oil, and whale oil; hardened oils, fractionated oils, hardened and fractionated oils, fractionated and hardened oils, and processed fats or oils subjected to ester exchange and the like with these oils; mixed fats or oils thereof; and the like.

The transesterified fat or oil of the present invention satisfies all of the following (A) to (F), in which a total content of (B) and (E) is 10 mass % to 20 mass %, a content of CN30 to CN38 is 18 to 50 mass %, and a content of CN48 or higher is 35 mass % or less.

A content (A) of saturated fatty acids having 6 to 18 carbon atoms in a composition of constituent fatty acids is 90 to 99.5 mass %.

A content (B) of saturated fatty acids having 6 to 10 carbon atoms in the composition of constituent fatty acids is 6 to 18 mass %.

A content (C) of lauric acid in the composition of constituent fatty acids is 20 to 50 mass %.

A content (D) of saturated fatty acids having 16 to 18 carbon atoms in the composition of constituent fatty acids is 30 to 50 mass %.

A content (E) of unsaturated fatty acids in the composition of constituent fatty acids is 0.5 to 10 mass %.

A content (F) of trans fatty acids in the composition of constituent fatty acids is 5 mass % or less.

This is provided that the fatty acids are propyl-esterified and analyzed in analysis of the composition of fatty acids.

CN30 to CN38: Triglycerides in which a total number of carbon atoms of the constituent fatty acids of the triglycerides in the fat or oil is 30 to 38.

CN48 or higher: Triglycerides in which a total number of carbon atoms of the constituent fatty acids of the triglycerides in the fat or oil is 48 or more.

A characteristic of the transesterified fat or oil of the present invention is that the content (E) of unsaturated fatty acids in the composition of constituent fatty acids can be mentioned as an important difference as compared with non-tempered hard butter obtained in the related art, in which the content (E) is 0.5 to 10 mass %, preferably 1 to 9 mass %, more preferably 1 to 8 mass %, and even more preferably 1 to 7 mass %. When the content of unsaturated fatty acids exceeds 10 mass %, the amount of triglycerides having a low melting point increases, which is not desirable. When the content is less than 0.5 mass %, an amount of triglycerides having a low melting point may be excessively small. In addition, a content of oleic acid is preferably 0.5 to 7 mass % and is more preferably 1 to 6 mass %. When the content of oleic acid exceeds 7 mass %, triglycerides having a low melting point increases, which is not desirable. When the content is less than 0.5 mass %, an amount of triglycerides having a low melting point may be excessively small.

It is estimated that it is possible to inhibit lowering of a melting point of the transesterified fat or oil and obtain sharp melting-point characteristics when the content (E) of unsaturated fatty acids in the composition of constituent fatty acids is 0.5 to 10 mass %, or instead, when the content of saturated fatty acids having 6 to 10 carbon atoms in the composition of constituent fatty acids is 6 to 18 mass %. This is because in this case generation of triglycerides having a low melting point can be inhibited, a required amount of triglycerides having a high melting point can be minimized, and thereby a favorable melting sensation in the mouth can be obtained when chocolate is produced. Such inhibition of generation of triglycerides having a low melting point and suppression of generation of triglycerides having a high melting point also lead to obtaining sharp melting-point characteristics without performing fractionation. When the content of saturated fatty acids having 6 to 10 carbon atoms exceeds 18 mass %, an amount of triglycerides having a low melting point in the obtained transesterified fat or oil increases, which is not desirable. On the other hand, when the content is less than 6 mass %, an amount of triglycerides having a desired medium melting point decreases, and sharp melting-point characteristics cannot be obtained, which is not desirable. The content of saturated fatty acids having 6 to 10 carbon atoms is preferably 6 to 18 mass %, more preferably 6 to 15 mass %, even more preferably 7 to 15 mass %, and most preferably 8 to 15 mass %.

In the transesterified fat or oil of the present invention, a total content of the content (B) of saturated fatty acids having 6 to 10 carbon atoms and the content (E) of unsaturated fatty acids in the composition of constituent fatty acids is 10 mass % to 20 mass %. Sharp melting-point characteristics are obtained by setting the content within this range. When the content exceeds 20 mass %, an amount of triglycerides having a low melting point increases, which is not desirable.

In the transesterified fat or oil of the present invention, the content of saturated fatty acids having 6 to 18 carbon atoms in the composition of constituent fatty acids is 90 to 99.5 mass % and is preferably 95 to 99 mass %. When the content is less than 90 mass %, desired sharp melting-point characteristics of the transesterified fat or oil cannot be obtained. When the content exceeds 99.5 mass %, an amount of triglycerides having a low melting point may be excessively small.

In the transesterified fat or oil of the present invention, the content of lauric acid in the composition of constituent fatty acids is 20 to 50 mass %, preferably 25 to 50 mass %, more preferably 25 to 45 mass %, and even more preferably 30 to 45 mass %. When the content is less than 20 mass %, relative contents of stearic acid and palmitic acid in the content of saturated fatty acids increase. This results in worsening of melting sensation in the mouth, and thereby sharp melting-point characteristics cannot be obtained. When the content of lauric acid exceeds 50 mass %, relative contents of stearic acid and palmitic acid in the content of saturated fatty acids decrease. This results in a decrease in SFC % at all temperature ranges, and thereby sharp melting-point characteristics cannot be obtained.

In the transesterified fat or oil of the present invention, the content of saturated fatty acids having 16 to 18 carbon atoms in the composition of constituent fatty acids is 30 to 50 mass % and is preferably 35 to 50 mass %. When the content is less than 30 mass %, desired sharp melting-point characteristics of the transesterified fat or oil cannot be obtained. When the content exceeds 50 mass %, melting sensation in the mouth worsens, which is not desirable.

In the present specification, a fatty acid composition of the fat or oil is measured by propyl esterifying fatty acid residues according to a method described in "The Collaborative Study on the Enzymatic Analysis of Positional Distribution of Short- and Medium-chain Fatty Acids in Milk Fat Using Immobilized *Candida antarctica* Lipase B," which has been reported by Yoshinaga et al. In a generally used method of methyl esterifying fatty acid residues using a strong alkali-methanol solution, numerical values obtained by analysis may be detected as smaller values than actual values, or accuracy may deteriorate, particularly in a case of short chain fatty acid contents such as C6 to C8. By carrying out analysis of a fatty acid composition by propylation, these problems can be alleviated, and thereby highly accurate measurement can be carried out.

In the transesterified fat or oil of the present invention, a content of CN30 to CN38 (triglycerides in which a total number of carbon atoms of the constituent fatty acids of the triglycerides in the fat or oil is 30 to 38) is 18 to 50 mass % and is preferably 20 to 40 mass %. By setting the content to 18 to 50 mass %, sharp melting-point characteristics can be obtained. When the content is less than 18 mass %, a SFC % at 25° C. to 35° C. decreases, which is not desirable.

In the transesterified fat or oil of the present invention, a content of CN48 or higher (triglycerides in which a total number of carbon atoms of the constituent fatty acids of the triglycerides in the fat or oil is 48 or more) is 35% by mass or less, preferably 5 to 35% by mass, more preferably 30% by mass or less, and even more preferably 5 to 30% by mass. When the content exceeds 35 mass %, an amount of triglycerides having a high melting point may increase in a case where a content of saturated fatty acids is large, or an amount of triglycerides having a low melting point may increase in a case where a content of unsaturated fatty acids is large, and desired sharp melting-point characteristics of the transesterified fat or oil may not be obtained.

In the transesterified fat or oil of the present invention, a value of (content of CN 48 or higher)/(content of CN28 or lower) is preferably 30 or less, preferably 1.5 to 30, more preferably 2 to 30, and even more preferably 2 to 20. This range is preferable because desired sharp melting-point characteristics can be then easily obtained.

Where, CN48 or higher: triglycerides in which a total number of carbon atoms of the constituent fatty acids of the triglycerides in the fat or oil is 48 or more, and CN28 or lower: triglycerides in which a total number of carbon atoms of the constituent fatty acids of the triglycerides in the fat or oil is 28 or less.

In the transesterified fat or oil of the present invention, the content of saturated fatty acids having 12 or less carbon atoms in the composition of constituent fatty acids is preferably 35 to 60 mass % and more preferably 35 to 50 mass %. When the content is less than 35 mass %, melting sensation in the mouth may worsen in a case where a content of saturated fatty acids having 16 or more carbon atoms relatively increases. When the content of unsaturated fatty acids having 16 or more carbon atoms relatively increases, desired sharp melting-point characteristics of the transesterified fat or oil may not be obtained. In addition, also when the content exceeds 60 mass %, desired sharp melting-point characteristics of the transesterified fat or oil may not be obtained.

In the transesterified fat or oil of the present invention, the content of saturated fatty acids having 20 or more carbon atoms in the composition of constituent fatty acids is preferably 1 mass % or less, more preferably 0.5 mass % or less, and even more preferably 0.3 mass % or less. Even when a content of saturated fatty acids having 20 or more carbon atoms is 1 mass % or less, sharp melting-point characteristics and a favorable solidification speed can be obtained for the transesterified fat or oil of the present invention.

Fats or oils to be used as the transesterified fat or oil of the present invention are not particularly limited in as long as the above-described constitution is satisfied, but preferably a transesterified fat or oil of transesterifying raw material fats or oils obtained by mixing the following fat or oil component X with the following fat or oil component Y.

The fat or oil component X is one or more kinds of fats or oils selected from coconut oils, palm kernel oils, and fats or oils processed therefrom.

The fat or oil component Y is a non-lauric fat or oil having a high melting point.

Examples of coconut oils, palm kernel oils, and fats or oils processed therefrom, which can be used as the fat or oil component X, include hardened coconut oils, palm kernel fractionated hardened oils, and palm kernel fractionated oils.

The above fats or oils may be used alone or in combination of two or more kinds thereof.

As the non-lauric fat or oil having a high melting point, which can be used as the fat or oil component Y, it is possible to use hardened oils of non-lauric fats or oils, fractionated oils, hardened and fractionated oils, fractionated and hardened oils, transesterified oils of non-lauric fats or oils, or processed fats or oils of transesterified oils of non-lauric fats or oils. Examples of non-lauric fractionated fats or oils having a high melting point include palm stearin obtained by fractionating a palm oil.

The above fats or oils may be used alone or in combination of two or more kinds thereof.

Transesterification methods can be classified into a method for specifically exchanging only fatty acids bonded to the 1- and 3-positions of a triglyceride using an enzyme (lipase) (1,3-position specific transesterification method), and a method in which an enzyme or a metal catalyst (for example, sodium methylate) is used to perform an unspecified exchange regardless of bonding positions (random transesterification). The latter random transesterification is preferable as the transesterification in the present invention. This is preferable because the greater the number of types of triglyceride obtained, the longer the period of time over which the quality of chocolate not subjected to tempering is stable.

A preferable aspect of the transesterified fat or oil of the present invention is a transesterified fat or oil having a favorable solidification speed desired as a fat or oil for chocolates. The solidification speed can be increased by increasing an amount of fats or oils having a high melting point, but when it is excessively increased, melting sensation in the mouth tends to worsen. The transesterified fat or oil of the present invention has a favorable melting sensation in the mouth and also has a favorable solidification speed.

The transesterified fat or oil of the present invention can be used for chocolates. A preferable aspect of the transesterified fat or oil of the present invention is a transesterified fat or oil in which sharp-change fat or oil physical properties can be obtained without performing a fractionation step after transesterification, and which can be used for chocolates. An amount of the transesterified fat or oil of the present invention used is 10 to 65 mass %, preferably 10 to 50 mass %, and more preferably 15 to 45 mass %, with respect to a total mass of chocolate. When the amount of the transesterified fat or oil of the present invention is less than 10 mass %, and in a case where it is used for coating applications, characteristics such as solidification speed, gloss after solidification, and difficulty of peeling off from a subject that has been coated therewith when the subject is eaten may not be obtained. When the amount exceeds 65 mass %, it is not preferable because the above-mentioned characteristics may be obtained, but a favorable flavor may not be obtained, and an oily mouthfeel may become strong.

In addition, the chocolates mentioned herein are not limited to chocolate, quasi chocolate, and chocolate-utilizing food products, which are defined by The Fair Trade Council of the National Chocolate Industry and The Fair Trade Council of Chocolate-Utilizing Food Products, and also include products that contain fats or oils as essential ingredients, which are food products obtained by processing fats or oils using cacao mass, cocoa, cocoa butter, cocoa butter substitute, hard butter, or the like.

The transesterified fat or oil of the present invention preferably satisfies all of the following with regard to a SFC %. The following with regard to a SFC % is preferable because, when the transesterified fat or oil is used for chocolates, it then has characteristics of sharp-change melting sensation in the mouth and no aftertaste.

A SFC at 10° C. is 85% to 100%.
A SFC at 20° C. is 65% to 80%.
A SFC at 25° C. is 49% to 75%.
A SFC at 30° C. is 25% to 55%.
A SFC at 35° C. is 5% to 30%.
A SFC at 40° C. is 10% or less.

In addition, as a more preferable aspect, the transesterified fat or oil of the present invention has all of the following with regard to a SFC % when a value of (content of CN48 or higher)/(content of CN28 or lower) is 30 or less.

A SFC at 10° C. is 85% to 100%.
A SFC at 20° C. is 65% to 80%.
A SFC at 25° C. is 49% to 70%,
A SFC at 30° C. is 25% to 50%,
A SFC at 35° C. is 5% to 30%.
A SFC at 40° C. is 10% or less.

Where, CN48 or higher: triglycerides in which a total number of carbon atoms of the constituent fatty acids of the triglycerides in the fat or oil is 48 or more, and CN28 or lower: triglycerides in which a total number of carbon atoms of the constituent fatty acids of the triglycerides in the fat or oil is 28 or less.

In addition, as an even more preferable aspect, the transesterified fat or oil of the present invention satisfies all of the following with regard to a SFC % when a content of CN48 or higher is satisfied to be 30 mass % or less.

A SFC at 10° C. is 85% to 100%.
A SFC at 20° C. is 65% to 80%.
A SFC at 25° C. is 49% to 70%.
A SFC at 30° C. is 25% to 50%.
A SFC at 35° C. is 5% to 30%.
A SFC at 40° C. is 5% or less.

A content of fats or oils in chocolates is preferably 30 to 70 mass % and is more preferably 40 to 60 mass %. When the content of fats or oils is small, viscosity of chocolates is too high, and a coating operation may be difficult when it is used for coating applications. On the other hand, when the content of fats or oils is too large, it is not preferable because then, a chocolate flavor may become duller, and a chocolate may become oily.

A method for manufacturing chocolates formed of the transesterified fat or oil of the present invention can be carried out in a general manner for manufacturing chocolates. Specifically, the chocolate can be obtained by using the transesterified fat or oil of the present invention as an essential ingredient, appropriately selecting and incorporating raw materials such as sugars, cacao mass, cocoa butter, various powdered foods such as cocoa powder and milk powder, emulsifiers, flavors, and colorants, rolling the mixture, and conching it.

For chocolates formed of the transesterified fat or oil of the present invention, it is possible to use an emulsifier generally used for manufacturing chocolates. Examples thereof include polyglycerin fatty acid esters, sucrose fatty acid esters, sorbitan fatty acid esters, organic acid monoglycerin fatty acid esters, polysorbates, and polyglycerin condensed ricinoleic acid ester. These may be used in a combination of two or more kinds thereof.

A preferable usage application of the transesterified fat or oil of the present invention is chocolates for coating. In the present invention, the chocolates for coating are food products obtained by processing fats or oils in which fats or oils form a continuous phase, and examples thereof include chocolates for coating which are for coating or covering a surface of confectionery, bakery products, and the like.

In the present invention, complex foods obtained by being coated with the chocolates for coating are not particularly limited as long as they are confectionery and bakery products. Examples of confectionery include manju, steamed yokan, castella, dorayaki, Imagawa yaki, taiyaki, kintsuba, waffles, chestnut buns, moon cake, bolo, yatsuhashi, rice crackers, karinto, donuts, sponge cake, roll cake, angel cake, pound cake, baumkuchen, fruit cake, madeleine, cream puffs, eclairs, millfeuille, apple pie, tart, biscuits, cookies, crackers, steamed bread, pretzels, wafers, snacks, pizza pies, crepes, souffles, beignets and the like, and confectionery such as fruits, for example, bananas, apples, and strawberries coated with a fat or oil composition, and the like. Examples of bread include sliced bread, bread roll, fruit bread, corn bread, butter rolls, hamburger buns, french bread, rolls, confectionery bread, sweet dough, hardtack, muffins, bagels, croissants, Danish pastries, naan, and the like. Although the chocolates for coating can be used for frozen ice desserts, a favorable effect of the present invention is obtained when it is used at preferably room temperature.

For the chocolate for coating formed of the transesterified fat or oil of the present invention, a coating operation is performed without a tempering treatment of molten chocolates for coating, but as for coating conditions, it is preferable that cooling be performed at a refrigerating temperature of 15° C. or lower after coating from a molten state, and solidification be performed quickly.

EXAMPLES

Hereinafter, the present invention will be described in more detail by illustrating examples of the present invention. In the examples, both % and part mean on a weight basis.

(Analytical Method)
(Method of Analyzing Fatty Acid Composition by Propylation)

A fatty acid composition of a fat or oil was propylesterified according to the method described in "The Collaborative Study on the Enzymatic Analysis of Positional Distribution of Short- and Medium-chain Fatty Acids in Milk Fat Using Immobilized *Candida antarctica* Lipase B," which has been reported by Yoshinaga et al., instead of being subjected to the usual methyl esterification, and analysis by gas chromatography was performed according to standard methods for the analysis of fats, oils and related materials established by the Japan Oil Chemists' Society.

(Method of Analyzing Triglyceride Composition)

A total number of carbon atoms of fatty acids constituting a triglyceride in the fat or oil was measured according to "2.4.6 Triacylglycerol composition (gas chromatography method) in Standard methods for the analysis of fats, oils and related materials" established by the Japan Oil Chemists' Society.

(Method of Measuring SFC)

In measurement of (SFC at each temperature) and (Solidification speed), a SFC was measured according to IUPAC.2 150 SOLID CONTENT DETERMINATION IN FATS BY NMR. A "minispec mq20" manufactured by Bruker was used as an analyzer.

(Parallel Measurements of SFC at Each Temperature)

In order to evaluate dissolution characteristics, the fat or oil was kept at 80° C. for 10 minutes and then at 60° C. for 30 minutes to be completely dissolved, and it was kept at 0° C. for 1 hour to be solidified. Furthermore, it was kept at a predetermined temperature (10° C., 20° C., 25° C., 30° C., 35° C., 40° C.) for 30 minutes, and then a SFC (solid fat content) was measured.

(Solidification Speed)

The fat or oil was kept at 80° C. for 10 minutes and then at 60° C. for 30 minutes to be completely dissolved, it was stabilized at 20° C., and a SFC (solid fat content) after 3 minutes to 30 minutes was measured.

1.5 g of sodium methylate as a catalyst was added to 1.0 kg of raw material fats or oils prepared using the proportions shown in Table 1, random transesterification was carried out at 80° C. for 30 minutes, and then washing with water/decolorization/deodorization were performed by general methods. Thereby, a transesterified fat or oil was obtained. Regarding medium-chain-triacylglycerols-bonded fats or oils, MCT-64 (manufactured by Fuji Oil Co., Ltd.) in which n-octanoic acid (8 carbon atoms) and n-decanoic acid (10 carbon atoms) were used as constituent fatty acids and a weight ratio thereof was 60:40 was used.

Table 1 shows results of analyzing the fatty acid composition according to the method of analyzing a fatty acid composition. In addition, Table 3 shows results of analyzing the triglyceride composition according to the method of analyzing a triglyceride composition. In Table 1, an iodine value is denoted as IV.

TABLE 1

Unit: mass %

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Raw material fats or oils | Palm stearin (IV12) | 15 | 20 | 25 | 30 | | | 15 | 35 | | 40 | | 45 | 23 |
| | Extremely hardened coconut oil (IV < 1) | 70 | 70 | 75 | 70 | 20 | 30 | 70 | 65 | | 60 | | | |
| | Palm stearin (IV30) | 15 | 10 | | | | | 6 | | | | | | |
| | Extremely hardened palm oil (IV < 1) | | | | | 30 | | 9 | | 40 | | | | |
| | Coconut oil | | | | | 50 | 40 | | | 60 | | 60 | | |
| | Extremely hardened rapeseed oil (IV < 1) | | | | | | 30 | | | | | 40 | | 22 |
| | Extremely hardened high erucic acid rapeseed oil (IV < 1) | | | | | | | | | | | | | |
| | Rapeseed oil | | | | | | | | | | | | | |
| | Medium melting point portion of fractionated palm (IV46) | | | | | | | | | | | | | |
| | Extremely hardened palm kernel oil (IV < 1) | | | | | | | | | | | | | |
| | Palm kernel stearin (IV7) | | | | | | | | | | | | 16 | 26 |
| | Extremely hardened palm kernel stearin oil (IV < 1) | | | | | | | | | | | | 35 | 25 |
| | Medium-chain-triacylglycerols-bonded fats or oils (IV < 1) | | | | | | | | | | | | 4 | 4 |
| | Transesterification reaction | Y | Y | Y | Y | Y | Y | Y | Y | Y | Y | Y | Y | Y |
| Fatty acid composition | C6:0 | 0.2 | 0.2 | 0.2 | 0.2 | 0.2 | 0.2 | 0.2 | 0.2 | 0.2 | 0.2 | 0.2 | 0.0 | 0.0 |
| | C8:0 | 5.6 | 5.6 | 6.2 | 5.8 | 5.8 | 5.8 | 5.8 | 5.4 | 5.0 | 5.0 | 5.0 | 3.3 | 3.3 |
| | C10:0 | 4.3 | 4.3 | 4.7 | 4.3 | 4.3 | 4.3 | 4.3 | 4.1 | 3.7 | 3.7 | 3.7 | 3.1 | 3.1 |
| | C12:0 | 33.5 | 33.7 | 36.0 | 33.5 | 33.8 | 34.0 | 33.6 | 31.4 | 28.8 | 28.7 | 28.7 | 28.7 | 28.6 |
| | C14:0 | 12.9 | 12.9 | 13.6 | 12.9 | 13.0 | 12.8 | 13.1 | 12.0 | 10.9 | 11.1 | 10.5 | 11.5 | 11.2 |
| | C16:0 | 28.4 | 29.3 | 27.4 | 31.3 | 20.3 | 7.7 | 26.6 | 34.8 | 22.4 | 38.8 | 6.9 | 41.4 | 22.4 |
| | C18:0 | 9.0 | 8.8 | 8.9 | 8.8 | 19.2 | 31.5 | 13.0 | 8.2 | 23.3 | 8.1 | 38.7 | 6.4 | 24.4 |
| | C18:1 | 5.2 | 4.4 | 2.4 | 2.8 | 2.6 | 2.4 | 2.9 | 3.1 | 3.6 | 3.6 | 3.5 | 4.3 | 3.7 |
| | C18:2 | 1.0 | 0.8 | 0.5 | 0.4 | 0.5 | 0.5 | 0.6 | 0.6 | 0.9 | 0.7 | 0.9 | 0.8 | 0.6 |
| | C18:3 | 0.0 | 0.0 | 0.0 | 0.0 | 0.0 | 0.0 | 0.0 | 0.0 | 0.0 | 0.0 | 0.0 | 0.0 | 0.0 |
| | C20:0 | 0.0 | 0.0 | 0.0 | 0.0 | 0.3 | 0.6 | 0.0 | 0.0 | 0.2 | 0.0 | 0.8 | 0.1 | 0.5 |
| | C22:0 | 0.0 | 0.0 | 0.0 | 0.0 | 0.0 | 0.0 | 0.0 | 0.0 | 0.0 | 0.0 | 0.0 | 0.0 | 0.0 |
| | C24:0 | 0.0 | 0.0 | 0.0 | 0.0 | 0.0 | 0.0 | 0.0 | 0.0 | 0.0 | 0.0 | 0.0 | 0.0 | 0.0 |
| | Content of saturated fatty acids having 6 to 18 carbon atoms | 93.8 | 94.8 | 97.1 | 96.8 | 97.0 | 97.1 | 96.5 | 96.2 | 94.5 | 95.7 | 94.4 | 94.5 | 93.4 |
| | Content of saturated fatty acids having 6 to 10 carbon atoms | 10.0 | 10.1 | 11.1 | 10.3 | 10.3 | 10.4 | 10.3 | 9.8 | 8.9 | 8.9 | 8.9 | 6.4 | 6.4 |
| | Content of saturated fatty acids having 16 to 18 carbon atoms | 37.3 | 38.2 | 36.4 | 40.2 | 39.5 | 39.2 | 39.6 | 43.1 | 45.7 | 47.0 | 45.6 | 47.8 | 46.8 |
| | Content of saturated fatty acids having 12 or less carbon atoms | 43.6 | 43.7 | 47.1 | 43.7 | 44.1 | 44.4 | 43.9 | 41.2 | 37.7 | 37.6 | 37.6 | 35.1 | 35.0 |
| | Content of saturated fatty acids having 20 or more carbon atoms | 0.0 | 0.0 | 0.0 | 0.0 | 0.3 | 0.6 | 0.0 | 0.0 | 0.2 | 0.0 | 0.8 | 0.1 | 0.5 |

TABLE 1-continued

| | | Example | | | | | | | | | | | | Unit: mass % |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Content of unsaturated fatty acids | | 6.2 | 5.2 | 2.9 | 3.2 | 3.0 | 2.9 | 3.5 | 3.8 | 4.5 | 4.3 | 4.4 | 5.1 | 4.3 |
| Total content of content of saturated fatty acids having 6 to 10 carbon atoms and content of unsaturated fatty acids | | 16.3 | 15.2 | 14.0 | 13.5 | 13.4 | 13.3 | 13.7 | 13.6 | 13.4 | 13.2 | 13.3 | 11.5 | 10.7 |
| Content of trans fatty acids | | <1 | <1 | <1 | <1 | <1 | <1 | <1 | <1 | <1 | <1 | <1 | <1 | <1 |

1.5 g of sodium methylate as a catalyst was added to 1.0 kg of raw material fats or oils prepared at a ratio shown in Table 2, random transesterification was carried out at 80° C. for 30 minutes, and then washing with water/decolorization/deodorization were performed by general methods. Thereby, a transesterified fat or oil was obtained. As a medium-chain-triacylglycerols-bonded fats or oils, MCT-64 (manufactured by Fuji Oil Co., Ltd.) in which n-octanoic acid (8 carbon atoms) and n-decanoic acid (10 carbon atoms) were used as constituent fatty acids and a weight ratio thereof was 60:40 was used. Table 2 shows results of analyzing the fatty acid composition according to the method of analyzing a fatty acid composition. In addition, Table 3 shows results of analyzing the triglyceride composition according to the method of analyzing a triglyceride composition. In Table 2, an iodine value is denoted as IV.

TABLE 2

| | | | | | | Unit: mass % |
|---|---|---|---|---|---|---|
| | | | Comparative Example | | | |
| | | 1 | 2 | 3 | 4 | 5 |
| Raw material fats or oils | Palm stearin (IV12) | | | | | |
| | Extremely hardened coconut oil (IV < 1) | | 53 | | | |
| | Palm stearin (IV30) | 50 | | 15 | | 45 |
| | Extremely hardened palm oil (IV < 1) | | 29 | | | |
| | Coconut oil | 40 | | | | |
| | Extremely hardened rapeseed oil (IV < 1) | | | | 45 | |
| | Extremely hardened high erucic acid rapeseed oil (IV < 1) | 10 | | | | |
| | Rapeseed oil | | 18 | | | |
| | Medium melting point portion of fractionated palm (IV46) | | | 35 | | |
| | Extremely hardened palm kernel oil (IV < 1) | | | 50 | | |
| | Palm kernel stearin (IV7) | | | | 51 | 16 |
| | Extremely hardened palm kernel stearin oil (IV < 1) | | | | | 35 |
| | Medium-chain-triacylglycerols-bonded fats or oils (IV < 1) | | | | 4 | 4 |
| | Transesterification reaction | Y | Y | Y | Y | Y |
| Fatty acid composition | C6:0 | 0.1 | 0.1 | 0.0 | 0.0 | 0.0 |
| | C8:0 | 4.1 | 4.4 | 1.9 | 3.3 | 3.3 |
| | C10:0 | 3.1 | 3.3 | 1.7 | 3.0 | 3.1 |
| | C12:0 | 24.6 | 25.9 | 23.4 | 28.5 | 28.5 |
| | C14:0 | 9.8 | 10.1 | 8.3 | 10.9 | 11.3 |
| | C16:0 | 29.7 | 18.5 | 31.6 | 3.5 | 32.8 |
| | C18:0 | 7.3 | 21.7 | 13.7 | 42.5 | 5.8 |
| | C18:1 | 12.8 | 11.3 | 16.4 | 3.0 | 12.0 |
| | C18:2 | 2.9 | 3.3 | 3.0 | 0.4 | 2.4 |
| | C18:3 | 0.0 | 1.2 | 0.0 | 0.0 | 0.0 |
| | C20:0 | 0.9 | 0.0 | 0.0 | 0.8 | 0.0 |
| | C22:0 | 4.6 | 0.0 | 0.0 | 0.0 | 0.0 |
| | C24:0 | 0.0 | 0.0 | 0.0 | 0.0 | 0.0 |
| | Content of saturated fatty acids having 6 to 18 carbon atoms | 84.3 | 84.1 | 80.6 | 92.5 | 84.9 |
| | Content of saturated fatty acids having 6 to 10 carbon atoms | 7.4 | 7.8 | 3.6 | 6.3 | 6.4 |
| | Content of saturated fatty acids having 16 to 18 carbon atoms | 37.0 | 40.3 | 45.3 | 46.0 | 38.6 |
| | Content of saturated fatty acids having 12 or less carbon atoms | 32.0 | 33.7 | 27.1 | 34.8 | 34.9 |
| | Content of saturated fatty acids having 20 or more carbon atoms | 5.5 | 0.0 | 0.0 | 0.8 | 0.0 |

TABLE 2-continued

|  | Unit: mass % Comparative Example | | | | |
|---|---|---|---|---|---|
|  | 1 | 2 | 3 | 4 | 5 |
| Content of unsaturated fatty acids | 15.7 | 15.9 | 19.4 | 3.4 | 14.4 |
| Total content of content of saturated fatty acids having 6 to 10 carbon atoms and content of unsaturated fatty acids | 23.1 | 23.7 | 23.1 | 9.8 | 20.7 |
| Content of trans fatty acids | <1 | <1 | <1 | <1 | <1 |

(Evaluation of Analytical Value of Fatty Acid Composition)

Numerical values of the following (A) to (H) were evaluated.

A content (A) of saturated fatty acids having 6 to 18 carbon atoms in a composition of constituent fatty acids was 90 to 99.5 mass %.

A content (B) of saturated fatty acids having 6 to 10 carbon atoms in the composition of constituent fatty acids was 6 to 18 mass %.

A content (C) of lauric acid in the composition of constituent fatty acids is 20 to 50 mass %.

A content (D) of saturated fatty acids having 16 to 18 carbon atoms in the composition of constituent fatty acids is 30 to 50 mass %.

A content (E) of unsaturated fatty acids in the composition of constituent fatty acids is 0.5 to 10 mass %.

A content (F) of trans fatty acids in the composition of constituent fatty acids is 5 mass % or less.

A content (G) of saturated fatty acids having 12 or less carbon atoms in the composition of constituent fatty acids is 35 to 60 mass %, and A content (H) of saturated fatty acids having 20 or more carbon atoms in the composition of constituent fatty acids is 1 mass % or less.

(Review of Table 1)

The transesterified oils of Examples 1 to 13 were within all of the numerical value ranges of (A) to (H). In addition, a total content of (B) and (E) was within the range of 10 mass % to 20 mass %.

(Review of Table 2)

Comparative Examples 1 to 3 and 5 did not satisfy (A).

Comparative Example 3 did not satisfy (B).

Comparative Examples 1 to 3 and 5 did not satisfy (E).

Comparative Examples 1 to 5 were comparative examples in which a total content of (B) and (E), which were recognized as important values, did not satisfy the numerical value range of 10 mass % to 20 mass %.

TABLE 3

| Triglyceride composition | Example | | | | | | | | | | | | | Comparative Example | | | | Unit: mass % |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 1 | 2 | 3 | 4 | 5 |
| CN22 | 0.3 | 0.3 | 0.4 | 0.3 | 0.3 | 0.2 | 0.2 | 0.2 | 0.1 | 0.2 | 0.1 | 0.0 | 0.0 | 0.0 | 0.1 | 0.0 | 0.0 | 0.1 |
| CN24 | 0.4 | 0.3 | 0.5 | 0.3 | 0.3 | 0.3 | 0.3 | 0.3 | 0.2 | 0.3 | 0.2 | 0.0 | 0.0 | 0.0 | 0.2 | 0.1 | 0.1 | 0.1 |
| CN26 | 1.1 | 1.1 | 1.5 | 1.0 | 1.0 | 1.0 | 1.0 | 1.0 | 0.5 | 1.0 | 0.5 | 0.0 | 0.2 | 0.1 | 0.5 | 0.4 | 0.3 | 0.4 |
| CN28 | 1.3 | 1.2 | 1.6 | 1.2 | 1.3 | 1.4 | 1.0 | 1.4 | 0.9 | 1.0 | 0.8 | 0.2 | 0.3 | 0.2 | 0.8 | 0.4 | 0.5 | 0.5 |
| CN30 | 1.8 | 1.9 | 2.2 | 1.8 | 1.7 | 1.6 | 1.8 | 1.7 | 1.5 | 1.6 | 1.1 | 0.4 | 0.5 | 0.5 | 1.1 | 0.9 | 0.5 | 1.0 |
| CN32 | 3.9 | 3.9 | 4.7 | 4.1 | 3.8 | 3.8 | 3.9 | 3.2 | 2.9 | 3.2 | 1.8 | 2.0 | 0.7 | 2.4 | 1.3 | 2.2 | 2.1 |   |
| CN34 | 4.8 | 4.8 | 5.7 | 5.0 | 4.7 | 4.5 | 4.8 | 4.1 | 3.8 | 3.6 | 3.5 | 2.6 | 2.5 | 1.2 | 2.7 | 1.2 | 2.4 | 2.6 |
| CN36 | 9.9 | 10.0 | 11.5 | 10.5 | 9.2 | 7.8 | 10.0 | 9.1 | 7.5 | 8.2 | 6.1 | 7.6 | 6.2 | 2.4 | 5.2 | 3.2 | 4.8 | 6.8 |
| CN38 | 10.7 | 10.7 | 11.7 | 10.8 | 10.8 | 10.9 | 10.8 | 9.6 | 9.1 | 8.7 | 9.2 | 8.5 | 8.1 | 2.9 | 4.3 | 4.0 | 7.7 | 7.9 |
| CN40 | 15.2 | 15.4 | 16.1 | 16.2 | 13.0 | 9.6 | 14.8 | 15.6 | 11.8 | 15.2 | 8.3 | 16.7 | 12.1 | 5.9 | 9.0 | 8.0 | 7.5 | 13.6 |
| CN42 | 14.7 | 14.6 | 14.2 | 14.3 | 15.3 | 15.7 | 14.9 | 13.9 | 14.9 | 13.4 | 15.0 | 14.6 | 15.0 | 6.8 | 13.9 | 11.5 | 15.5 | 14.8 |
| CN44 | 13.2 | 13.5 | 12.3 | 13.8 | 12.0 | 12.1 | 12.9 | 15.1 | 12.5 | 16.2 | 12.4 | 18.8 | 15.8 | 10.4 | 12.4 | 12.7 | 12.8 | 15.5 |
| CN46 | 10.9 | 10.8 | 9.0 | 10.2 | 11.0 | 8.1 | 11.0 | 11.5 | 12.9 | 12.1 | 8.6 | 13.0 | 11.0 | 12.2 | 13.5 | 17.3 | 9.0 | 14.8 |
| CN48 | 6.5 | 6.5 | 5.0 | 6.0 | 8.1 | 12.4 | 6.7 | 7.6 | 10.3 | 8.7 | 15.9 | 9.5 | 14.0 | 12.6 | 14.8 | 15.0 | 18.5 | 10.0 |
| CN50 | 3.6 | 3.6 | 2.5 | 3.2 | 4.1 | 4.8 | 3.7 | 4.3 | 5.4 | 5.0 | 5.9 | 4.9 | 6.0 | 13.8 | 7.5 | 11.3 | 7.1 | 6.4 |
| CN52 | 1.5 | 1.4 | 0.9 | 1.0 | 2.5 | 2.4 | 1.7 | 1.4 | 3.8 | 1.5 | 3.1 | 1.2 | 2.4 | 10.6 | 6.8 | 9.2 | 3.5 | 2.9 |
| CN54 | 0.2 | 0.2 | 0.0 | 0.1 | 0.9 | 3.3 | 0.3 | 0.2 | 1.4 | 0.2 | 5.7 | 0.1 | 3.7 | 8.6 | 4.5 | 3.3 | 7.3 | 0.6 |
| CN56 | 0.0 | 0.0 | 0.0 | 0.0 | 0.0 | 0.2 | 0.0 | 0.0 | 0.0 | 0.0 | 0.3 | 0.0 | 0.2 | 6.0 | 0.2 | 0.1 | 0.4 | 0.0 |
| CN58 or higher | 0.0 | 0.0 | 0.0 | 0.0 | 0.0 | 0.0 | 0.0 | 0.0 | 0.0 | 0.0 | 0.1 | 0.0 | 0.1 | 5.2 | 0.0 | 0.0 | 0.1 | 0.0 |
| Content of CN30 to CN38 | 31.2 | 31.2 | 35.9 | 32.3 | 30.2 | 28.6 | 31.4 | 27.7 | 25.2 | 25.1 | 23.2 | 21.0 | 19.3 | 7.7 | 15.8 | 10.6 | 17.6 | 20.4 |
| Content of CN48 or higher | 11.9 | 11.7 | 8.5 | 10.4 | 15.6 | 23.0 | 12.4 | 13.6 | 21.0 | 15.4 | 30.9 | 15.7 | 26.3 | 56.7 | 33.8 | 39.0 | 36.9 | 19.9 |
| Content of CN48 or higher/content of CN28 or lower | 4.0 | 4.0 | 2.1 | 3.7 | 5.3 | 7.8 | 4.8 | 5.0 | 12.2 | 6.0 | 19.6 | 63.0 | 48.4 | 189.3 | 21.9 | 43.9 | 44.0 | 18.9 |

(Evaluation of Analytical Value of Triglyceride)

1. A content of CN30 to CN38 was 18 to 50 mass %
2. A content of CN48 or higher was 35 mass % or less
3. A value of (content of CN48 or higher)/(content of CN28 or lower) was 30 or less (Review of Table 3)

Examples 1 to 11 satisfied all the numerical value ranges of 1. to 3.

Examples 12 and 13 satisfied all the numerical value ranges of 1. and 2., but did not satisfy the numerical value range of 3.

In Example 11, the numerical value of 2. was 30.9, which exceeded 30 mass %.

Comparative Examples 1 to 4 did not satisfy the numerical value range of 1.

Comparative Examples 1, 3, and 4 did not satisfy the numerical value range of 2.

Comparative Examples 1, 3, and 4 did not satisfy the numerical value range of 3.

Table 4 shows results of measuring a SFC at each temperature in each of the fats or oils according to the measurement method of (SFC at each temperature).

TABLE 4

| Solid fat content | Example | | | | | | | | | | | | | Comparative Example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| 10° C. | 88.3 | 89.2 | 89.2 | 89.8 | 91.5 | 90.2 | 90.2 | 91.7 | 92.1 | 92.2 | 91.3 | 93.8 | 95.6 | 82.3 | 80.2 | 87.2 | 95.1 | 86.8 |
| 20° C. | 67.0 | 69.6 | 68.8 | 71.1 | 71.5 | 70.8 | 72.1 | 73.8 | 74.2 | 76.7 | 74.6 | 84.3 | 83.6 | 57.5 | 56.0 | 64.8 | 84.2 | 65.6 |
| 25° C. | 49.3 | 52.5 | 51.3 | 56.5 | 55.3 | 55.3 | 55.6 | 58.6 | 58.9 | 62.2 | 59.9 | 70.3 | 70.8 | 41.4 | 39.7 | 49.4 | 72.1 | 47.4 |
| 30° C. | 28.1 | 31.1 | 29.2 | 33.7 | 33.9 | 34.4 | 34.5 | 38.8 | 39.0 | 43.8 | 40.6 | 51.9 | 52.3 | 24.2 | 22.3 | 31.4 | 54.1 | 27.7 |
| 35° C. | 6.0 | 7.7 | 5.4 | 9.6 | 10.8 | 12.1 | 10.5 | 14.8 | 18.7 | 20.2 | 20.5 | 28.1 | 28.2 | 9.2 | 8.3 | 15.2 | 31.7 | 8.6 |
| 40° C. | 0.0 | 0.0 | 0.0 | 0.0 | 0.2 | 2.2 | 0.1 | 0.2 | 4.3 | 2.4 | 7.7 | 6.6 | 8.7 | 0.0 | 0.4 | 3.1 | 13.8 | 0.2 |

Unit: %

(Evaluation of SFC %)

A case in which all the following numerical value ranges were satisfied was used as an indicator for sharp melting-point characteristics.

A SFC at 10° C. was 85% to 100%.
A SFC at 20° C. was 65% to 80%.
A SFC at 25° C. was 49% to 75%.
A SFC at 30° C. was 25% to 55%.
A SFC at 35° C. was 5% to 30%.
A SFC at 40° C. was 10% or less.

A case in which all the following numerical value ranges were satisfied was used as an indicator for more preferable sharp melting-point characteristics.

A SFC at 10° C. was 85% to 100%.
A SFC at 20° C. was 65% to 80%.
A SFC at 25° C. was 49% to 70%.
A SFC at 30° C. was 25% to 50%.
A SFC at 35° C. was 5% to 30%.
A SFC at 40° C. was 10% or less.

A case in which all the following numerical value ranges were satisfied was used as an indicator for even more preferable sharp melting-point characteristics.

A SFC at 10° C. was 85% to 100%.
A SFC at 20° C. was 65% to 80%.
A SFC at 25° C. was 49% to 70%.
A SFC at 30° C. was 25% to 50%.
A SFC at 35° C. was 5% to 30%.
A SFC at 40° C. was 5% or less.

(Review of Table 4)

In Examples 1 to 13, sharp melting-point characteristics were obtained.

In Examples 1 to 11, more preferable sharp melting-point characteristics were obtained.

In Examples 1 to 10, even more preferable sharp melting-point characteristics were obtained.

In Comparative Examples 1 to 3 and 5 in which the total content of (B) and (E) exceeded 20 mass %, sharp melting-point characteristics were not obtained.

In Comparative Example 4 in which the total content of (B) and (E) was less than 10 mass %, sharp melting-point characteristics were not obtained.

Table 5 shows results of measuring a solidification speed according to the measuring method of (Solidification speed).

TABLE 5

| Solid fat content after cooling at 20° C. | Example | | | | | | | | | | | | | Comparative Example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| 3 minutes | 0.0 | 0.4 | 0.2 | 1.6 | 3.3 | 7.0 | 2.1 | 3.1 | 10.5 | 7.3 | 12.5 | 10.0 | 11.8 | 3.7 | 4.3 | 7.0 | 17.1 | 0.1 |
| 6 minutes | 8.5 | 13.3 | 9.5 | 18.5 | 14.8 | 14.2 | 18.2 | 20.2 | 25.4 | 28.9 | 20.0 | 34.5 | 30.8 | 10.7 | 10.8 | 22.8 | 28.2 | 6.2 |
| 10 minutes | 33.3 | 37.5 | 34.4 | 42.6 | 38.7 | 29.3 | 41.3 | 41.2 | 45.2 | 47.6 | 32.9 | 54.2 | 53.1 | 13.3 | 28.4 | 37.8 | 38.4 | 26.4 |
| 20 minutes | 49.4 | 52.1 | 51.3 | 56.2 | 54.2 | 54.3 | 54.9 | 57.0 | 57.1 | 59.3 | 57.3 | 67.0 | 66.6 | 39.9 | 40.5 | 47.2 | 68.3 | 47.2 |
| 30 minutes | 52.0 | 54.2 | 53.9 | 58.2 | 57.0 | 57.3 | 57.0 | 59.0 | 58.9 | 61.2 | 60.4 | 68.6 | 68.4 | 43.5 | 42.2 | 48.6 | 71.6 | 49.6 |

Unit: %

(Review of Table 5)

In Examples 1 to 13 in which sharp melting-point characteristics were obtained in the evaluation of SFC % and thus were regarded as suitable for use in chocolates, a solid fat content after 10 minutes exceeded 30%, and favorable results were also obtained for solidification speeds.

INDUSTRIAL APPLICABILITY

The present invention can be suitably used for a transesterified fat or oil showing sharp dissolution properties, and an oil-based food product formed of the transesterified fat or oil, particularly chocolate which is not subjected to a tempering operation.

The invention claimed is:

1. A transesterified fat or oil which satisfies all of the following (A) to (F),
   wherein a total content of (B) and (E) is 10 mass % to 20 mass %, a content of CN30 to CN38 is 18 to 50 mass %, and a content of CN48 or higher is 35 mass % or less,
   a content (A) of saturated fatty acids having 6 to 18 carbon atoms in a composition of constituent fatty acids is 90 to 99.5 mass %, a content
   a content (B) of saturated fatty acids having 6 to 10 carbon atoms in the composition of constituent fatty acids is 6 to 18 mass %,
   a content (C) of lauric acid in the composition of constituent fatty acids is 20 to 50 mass %,
   a content (D) of saturated fatty acids having 16 to 18 carbon atoms in the composition of constituent fatty acids is 30 to 50 mass %,
   a content (E) of unsaturated fatty acids in the composition of constituent fatty acids is 0.5 to 10 mass %, and
   a content (F) of trans fatty acids in the composition of constituent fatty acids is 5 mass % or less,
   where, the fatty acids are propyl-esterified and analyzed in analysis of the composition of fatty acids,
   CN30 to CN38 represents triglycerides in which a total number of carbon atoms of the constituent fatty acids of the triglycerides in the fat or oil is 30 to 38, and
   CN48 or higher represents triglycerides in which a total number of carbon atoms of the constituent fatty acids of the triglycerides in the fat or oil is 48 or more.

2. The transesterified fat or oil according to claim 1, which satisfies the following (G) and (H),
   a content (G) of saturated fatty acids having 12 or less carbon atoms in the composition of constituent fatty acids is 35 to 60 mass %, and
   a content (H) of saturated fatty acids having 20 or more carbon atoms in the composition of constituent fatty acids is 1 mass % or less,
   where, the fatty acids are propyl-esterified and analyzed in analysis of the composition of fatty acids.

3. The transesterified fat or oil according to claim 1,
   wherein (content of CN 48 or higher)/(content of CN 28 or lower) is 30 or less,
   where, CN48 or higher represents triglycerides in which a total number of carbon atoms of the constituent fatty acids of the triglycerides in the fat or oil is 48 or more, and
   CN28 or lower represents triglycerides in which a total number of carbon atoms of the constituent fatty acids of the triglycerides in the fat or oil is 28 or less.

4. The transesterified fat or oil according to claim 1,
   wherein a content of CN48 or higher is 30 mass % or less,
   CN48 or higher represents triglycerides in which a total number of carbon atoms of the constituent fatty acids of the triglycerides in the fat or oil is 48 or more.

5. The transesterified fat or oil according to claim 1, which satisfies all of the following with regard to a percentage of solid fat content,
   a solid fat content at 10° C. is 85% to 100%,
   a solid fat content at 20° C. is 65% to 80%,
   a solid fat content at 25° C. is 49% to 75%,
   a solid fat content at 30° C. is 25% to 55%,
   a solid fat content at 35° C. is 5% to 30%, and
   a solid fat content at 40° C. is 10% or less.

6. The transesterified fat or oil according to claim 3, which satisfies all of the following with regard to a percentage of solid fat content,
   a solid fat content at 10° C. is 85% to 100%,
   a solid fat content at 20° C. is 65% to 80%,
   a solid fat content at 25° C. is 49% to 70%,
   a solid fat content at 30° C. is 25% to 50%,
   a solid fat content at 35° C. is 5% to 30%, and
   a solid fat content at 40° C. is 10% or less.

7. The transesterified fat or oil according to claim 4, which satisfies all of the following with regard to a percentage of solid fat content,
   a solid fat content at 10° C. is 85% to 100%,
   a solid fat content at 20° C. is 65% to 80%,
   a solid fat content at 25° C. is 49% to 70%,
   a solid fat content at 30° C. is 25% to 50%,
   a solid fat content at 35° C. is 5% to 30%, and
   a solid fat content at 40° C. is 5% or less.

8. A fat or oil for chocolate, comprising the transesterified fat or oil according to claim 1.

9. Chocolate comprising the transesterified fat or oil according to claim 1.

* * * * *